Figure 5:
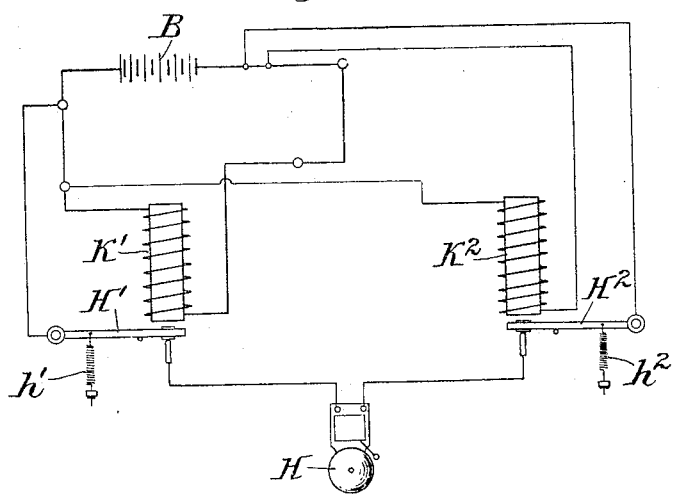

No. 640,787. Patented Jan. 9, 1900.
H. P. MAXIM.
DEVICE FOR INDICATING CONDITION OF STORAGE BATTERIES.
(Application filed Oct. 27, 1899.)
(No Model.) 2 Sheets—Sheet 1.
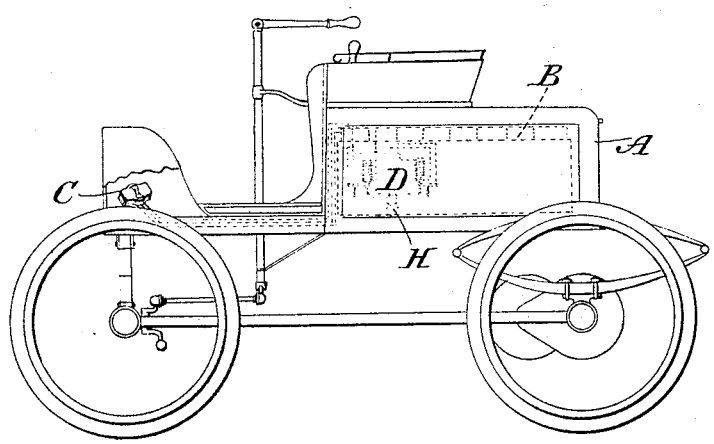
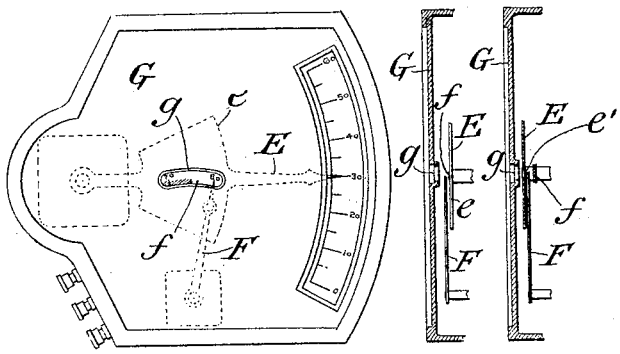
Attest:
Ro. H. Boardman.
A. N. Jesbera.
Inventor:
Hiram Percy Maxim
by Redding, Kiddle & Greeley
Attys.
THE NORRIS PETERS CO., PHOTO-LITHO., WASHINGTON, D. C.

No. 640,787. Patented Jan. 9, 1900.
H. P. MAXIM.
DEVICE FOR INDICATING CONDITION OF STORAGE BATTERIES.
(Application filed Oct. 27, 1899.)

(No Model.) 2 Sheets—Sheet 2.

Attest:
R. H. Boardman.
A. N. Jesbera.

Inventor:
Hiram Percy Maxim
by Redding, Kiddle & Greeley
Attys.

UNITED STATES PATENT OFFICE.

HIRAM PERCY MAXIM, OF HARTFORD, CONNECTICUT, ASSIGNOR TO THE COLUMBIA AND ELECTRIC VEHICLE COMPANY, OF SAME PLACE AND JERSEY CITY, NEW JERSEY.

DEVICE FOR INDICATING CONDITION OF STORAGE BATTERIES.

SPECIFICATION forming part of Letters Patent No. 640,787, dated January 9, 1900.

Application filed October 27, 1899. Serial No. 734,912. (No model.)

*To all whom it may concern:*

Be it known that I, HIRAM PERCY MAXIM, a citizen of the United States, residing in the city of Hartford, county of Hartford, State of Connecticut, have invented certain new and useful Improvements in Devices for Indicating the Condition of Storage Batteries, of which the following is a specification, reference being had to the accompanying drawings, forming a part hereof.

This invention is concerned particularly with the application of storage batteries to motor road-vehicles. Under such conditions of use the batteries are not ordinarily subject to the care of experts, and greater safeguards must therefore be thrown about their use. It is well understood that storage batteries can be used with safety under varying conditions of load until the potential or voltage falls permanently below a certain point and that further exhaustion of the batteries beyond this point occasions rapid deterioration of the batteries by reason of the destruction of the plates, so that they are therefore incapable of being recharged to the full amount which was before possible.

It is the object of this invention to provide means for warning the operator of the approach of the batteries toward the danger-point of exhaustion, and thereby to prevent injurious exhaustion, or at least to make it the result of wilful and deliberate action on the part of the operator, so that responsibility for the exhaustion shall be placed where it belongs, and it has been sought to provide for such a signal, either visual or audible, or both, which will be readily discerned and understood by inexpert operators. The devices employed, whether of one form or another, are dependent for their operation upon a decrease in the voltage or potential below a predetermined minimum under otherwise normal conditions, it being understood that the batteries will not be injuriously exhausted when the voltage or potential is reduced below the danger-point or predetermined minimum for a short time only, as when a heavy load is temporarily put upon the batteries in the case of a motor-vehicle mounting a steep grade. Under such conditions the amperage of the batteries furnishes a basis or means of determination whereby the signal becomes ineffective or inoperative.

Figure 6:
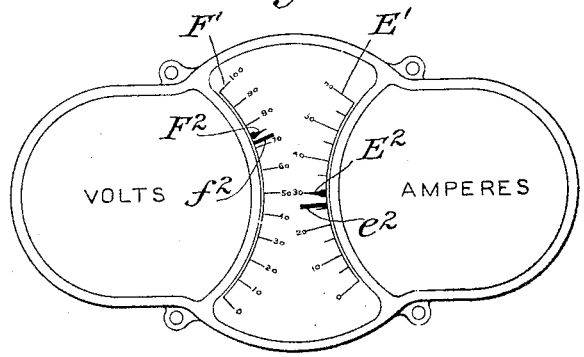

In the accompanying drawings, in which several embodiments of the invention are illustrated, Figure 1 is a view in side elevation of a motor-vehicle which is equipped with the present improvements, the dashboard being partly broken out to show the visual signal, while the battery and its connection to the visual signal and to the audible signal are represented by dotted lines. Fig. 2 is a plan view of one form of the visual signal. Fig. 3 is a transverse section of the signal shown in Fig. 2. Fig. 4 is a view similar to Fig. 3, but showing a slightly-different arrangement. Fig. 5 is a diagrammatic view of the audible signal and its connections which are indicated in Fig. 1. Fig. 6 is a plan view of another form of visual signal.

In the vehicle represented in Fig. 1 the body A receives and supports in the usual manner the storage battery B. The visual signal is conveniently located at the forward end of the foot-board, as at C, in a position where the eyes of the operator will readily fall upon it. The audible signal D may be located at any convenient point. The electrical connection between the battery and the visual signal is arranged in the usual manner, and the voltmeters and ammeters hereinafter referred to are also constructed as to their electrical windings and connections in the usual manner and need not be described in detail.

Referring now to the form of visual signal shown in Figs. 2 and 3, the ammeter-needle E is represented as having an enlargement or extension $e$ near its axis, upon which is formed the voltmeter-scale $f$ for an ordinary voltmeter-needle F, which is mounted at one side of the ammeter-needle. The plate or top G of the signaling device is slotted, as at $g$, so as to disclose the voltmeter-needle when the ammeter-needle is in its normal position—that is to say, when the discharge of the batteries is normal. Therefore when the ammeter-needle is in its normal position the operator can tell by a glance at the voltmeter-index $f$, which is then visible through the slot $g$, whether the voltmeter-needle indicates a safe or a dangerous condition of the batteries. On the other hand, if the ammeter-needle E is not in normal position, the rate of discharge being abnormal, the voltmeter-scale will not be visible, and the operator will be informed by that fact that it is unnecessary for him to ascertain the position of the voltmeter-needle. In other words, it is necessary for the operator to examine the device closely only at such times as the voltmeter-scale is visible, and then he will be informed at a glance by the position of the voltmeter-needle with respect to the danger-mark as to the condition of the batteries.

In the arrangement shown in Fig. 4 the voltmeter-scale $f$ is carried below the ammeter-needle E and the ammeter-needle is slotted, as at $e'$, so as to disclose the voltmeter-scale $f$ below it when the ammeter-needle is in normal position. When the scale is mounted on the ammeter-needle, it is desirable that the voltmeter-needle shall be of the same color as the main body of the ammeter-needle and of contrasting color with the scale, so that the voltmeter-needle shall be distinctly visible when the scale is in position and shall not be visible at other times. The voltmeter-scale may have a distinct danger-mark or may have one portion colored differently from the rest to indicate the danger position of the needle.

In the form of the visual signal shown in Fig. 6 the ammeter-scale $E'$ and the voltmeter-scale $F'$ are arranged side by side in close proximity, so that the operator can take them both in at a glance. In the drawings the ammeter-needle $E^2$ is represented as standing a little off from its normal position, which is indicated by a conspicuous mark, as at $e^2$, and the voltmeter-needle $F^2$ is represented as standing a short distance from a conspicuous mark $f^2$ on its scale, which is the danger-mark. Should the ammeter-needle stand on or near the normal-mark $e^2$ and the voltmeter-needle approach closely the danger-mark $f^2$, then the operator will be informed at a glance that the batteries are exhausted to a dangerous degree; but if the ammeter-needle stands away from the normal-mark then the operator need not consider the position of the voltmeter-needle.

The embodiment of the invention in an audible signal which may be combined to advantage with the visual signal is represented in Fig. 5. An ordinary magneto-electric bell H is represented as connected to the battery B through switches $H'$ and $H^2$, one on each side. The switches are controlled, respectively, by the amperage-solenoid $K'$ and the voltage-solenoid $K^2$, the switches being held normally closed by suitable springs $h'$ and $h^2$, respectively. So long as there is no current on the system both switches are closed; but under normal conditions the volt-switch at $H^2$ is open, being kept open by a voltage anywhere above the danger-point. The ampere-switch at $H'$ is normally closed, the amperage-solenoid not having sufficient power when the amperage is normal to open the switch and break the circuit. Consequently, if the voltage fall below the danger-point when other conditions are normal the alarm-circuit is closed and the alarm is given; but if during the drop of the voltage below the danger-point the amperage rises, then the ampere-switch will be open at the time when the volt-switch is closed and the alarm-circuit will not be complete.

It will be understood that the invention can be embodied in various other forms, and therefore is not to be restricted to the particular forms shown and described herein.

I claim as my invention—

1. As a means for indicating the condition of storage batteries, a device operated by permanent reduction in the voltage of the battery when the amperage is normal to indicate the exhaustion of the battery to a dangerous point and a device operated by abnormal amperage of the battery to offset or negative the action of the first-named device, substantially as shown and described.

2. As a means for indicating the condition of storage batteries, a voltmeter included in circuit with the battery, a signal controlled by said voltmeter to indicate reduction of the voltage, and an ammeter also included in circuit with the battery and controlling the action of the voltmeter-signal, whereby said signal is ineffective when the amperage is abnormal, substantially as shown and described.

3. As a means for indicating the condition of storage batteries, an ammeter and a voltmeter in circuit with the battery and having their indicator-scales in proximity, the ammeter-scale having a conspicuous mark to indicate the normal rate of discharge and the voltmeter-scale having a conspicuous mark to indicate a dangerous reduction in voltage, substantially as shown and described.

This specification signed and witnessed this 25th day of October, A. D. 1899.

HIRAM PERCY MAXIM.

In presence of—
M. L. CLARK,
HERMANN F. CUNTZ.